United States Patent
Ozeki et al.

(10) Patent No.: US 7,108,630 B2
(45) Date of Patent: Sep. 19, 2006

(54) CONTROL SYSTEM FOR HYBRID DRIVE UNIT

(75) Inventors: Tatsuya Ozeki, Torrance, CA (US); Hiroatsu Endo, Nagoya (JP); Atsushi Kayukawa, Anjo (JP); Kazuomi Okasaka, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 43 days.

(21) Appl. No.: 10/862,437

(22) Filed: Jun. 8, 2004

(65) Prior Publication Data
US 2004/0259680 A1 Dec. 23, 2004

(30) Foreign Application Priority Data
Jun. 23, 2003 (JP) ............................. 2003-178163

(51) Int. Cl.
*B60K 1/02* (2006.01)
(52) U.S. Cl. .......................................... 477/3
(58) Field of Classification Search ............... 477/3; 903/942, 910, 945, 911
See application file for complete search history.

(56) References Cited

U.S. PATENT DOCUMENTS

| | | | |
|---|---|---|---|
| 3,623,568 A | 11/1971 | Mori | |
| 5,088,354 A | 2/1992 | Asada | |
| 5,934,395 A | 8/1999 | Koide et al. | |
| 5,967,940 A | 10/1999 | Yamaguchi | |
| 6,425,838 B1 | 7/2002 | Matsubara et al. | |
| 6,556,910 B1 | 4/2003 | Suzuki et al. | |
| 6,709,362 B1 | 3/2004 | Tomohiro et al. | |
| 6,867,509 B1 | 3/2005 | Takaoka et al. | |
| 6,913,558 B1 | 7/2005 | Mori et al. | |
| 6,947,827 B1 | 9/2005 | Fuse et al. | |
| 6,959,238 B1 | 10/2005 | Morishita et al. | |
| 2003/0064854 A1 | 4/2003 | Kotani | |
| 2004/0084233 A1 | 5/2004 | Wakuta et al. | |
| 2004/0192494 A1* | 9/2004 | Ozeki et al. ................ 477/3 |
| 2004/0259680 A1 | 12/2004 | Ozeki et al. | |

FOREIGN PATENT DOCUMENTS

EP 0 641 684 3/1995

(Continued)

OTHER PUBLICATIONS

U.S. Appl. No. 10/851,320, filed May 24, 2004, Miura et al.

(Continued)

*Primary Examiner*—Dirk Wright
(74) *Attorney, Agent, or Firm*—Oblon, Spivak, McClelland, Maier & Neustadt, P.C.

(57) ABSTRACT

A control system for a hybrid drive unit, in which an assist prime mover is connected through a transmission mechanism to an output member, to which a torque outputted by a main prime mover is transmitted, comprises gear shift controller for switching a shift control condition of said transmission in accordance with the action state of said main prime mover. A gear shift is inhibited in case a vehicle is run by an assist prime mover, and the gear shift is inhibited also in case the assist prime mover outputs a torque in connection with starting the main prime mover. A transmission is operated into a state just before starting the shifting operation in case the gear shift is inhibited in connection with starting the main prime mover.

17 Claims, 4 Drawing Sheets

| | FOREIGN PATENT DOCUMENTS | | WO | WO 02/06072 | 1/2002 |
|----|----|----|----|----|----|
| JP | 47-31773 | 8/1972 | | OTHER PUBLICATIONS | |
| JP | 2000-266172 | 9/2000 | | | |
| JP | 2001-095103 | 4/2001 | U.S. Appl. No. 10/781,781, filed Feb. 20, 2004, Murakami et al. | | |
| JP | 2001-141045 | 5/2001 | U.S. Appl. No. 10/853,555, May 26, 2004, Ozeki et al. | | |
| JP | 2001-173773 | 6/2001 | U.S. Appl. No. 10/853,221, filed May 26, 2004, Ozeki et al. | | |
| JP | 2002-225578 | 8/2002 | U.S. Appl. No. 10/862,437, filed Jun. 8, 2004, Ozeki et al. | | |
| JP | 2003-74683 | 3/2003 | U.S. Appl. No. 11/166,644, filed Jun. 27, 2005, Endo et al. | | |

\* cited by examiner

FIG.4
(A)
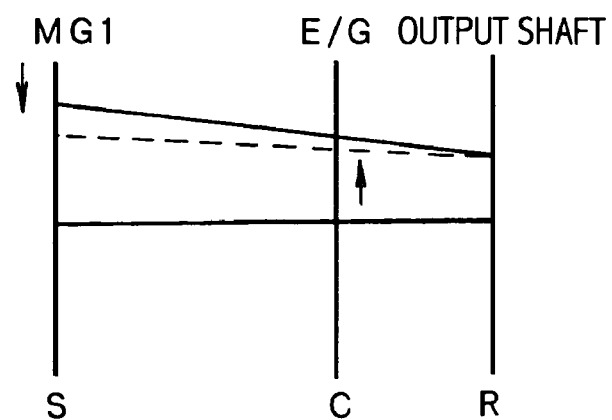
(B)
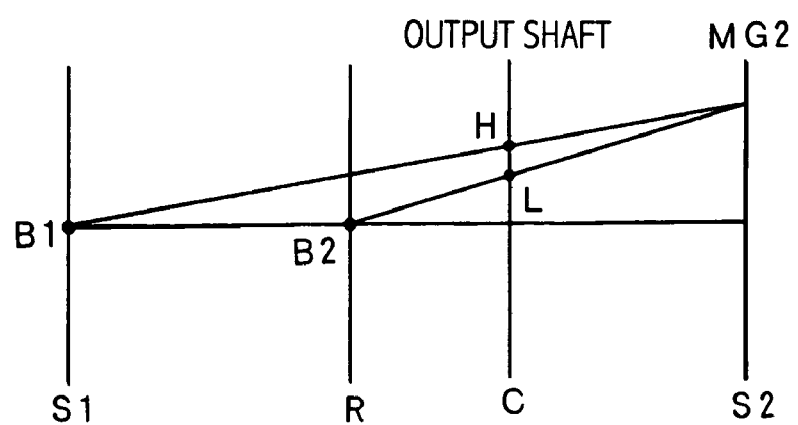

CONTROL SYSTEM FOR HYBRID DRIVE UNIT

BACKGROUND OF THE INVENTION

1. Field of the Invention

This invention relates to a hybrid drive unit provided with a plurality of prime movers as a power source for driving a vehicle, and more particularly, to a control system for a hybrid drive unit, wherein a second prime mover is connected through a transmission to an output member, to which a power is transmitted from a first prime mover.

The present invention relates to the subject matter contained in Japanese Patent Application No. 2003-178163, filed on Jun. 23, 2003, which is expressly incorporated herein by reference.

2. Description of the Related Art

One example of this kind of hybrid drive unit is disclosed in JP-A-2002-225578. In the hybrid drive unit described in this publication, an engine and a first motor generator are connected to each other through a synthesizing/distributing mechanism composed of a single pinion type planetary gear mechanism, an output member is connected to the synthesizing/distributing mechanism in a torque a torque transmittable manner, and a second motor generator is connected through a transmission mechanism to the output member.

According to the hybrid drive unit described in JP-A-2002-225578, therefore, a torque synthesized from an output torque of an engine and a torque of the first motor generator in accordance with a gear ratio of the single pinion type planetary gear mechanism appears on an output shaft, and an engine speed can be controlled by the first motor generator. Therefore, it is possible for the engine to be driven for the optimum fuel consumption thereby to improve a fuel consumption of a vehicle. Moreover, the torque can be applied to the output shaft, by generating an electric power (i.e., regeneration of energy) by the first motor generator so as to drive the second motor generator by the electric power generated, when the engine is being driven at the optimum fuel consumption. Therefore, sufficient driving force can be obtained without deteriorating the fuel consumption. Moreover, the torque outputted by the second motor generator can be raised and transmitted to the output shaft, by having an gear ratio to be set by the transmission greater than "1". And in case the gear ratio is reduced (e.g., in case the transmission is set in a high speed stage), a speed of the second motor generator can be decreased so that the second motor generator can be changed into a low power type or a small size type.

In Japanese Published Examined Application 47-31773, moreover, there is disclosed the hybrid drive unit, in which a low brake is released and a high brake is applied in case of switching to a high gear stage, and in which the high brake is released and the low brake is applied in case of switching to a low gear stage. Thus, the interchange between the high gear stage and the low gear stage can be achieved by switching a connection of the brakes.

According to the invention disclosed in the aforementioned JP-A-2002-225578, the engine is started by driving the first motor generator connected to the engine through the synthesizing/distributing mechanism. However, since the first motor generator is also connected to the output shaft, it is necessary for the torque not to appear on the output shaft during a startup of the engine, by countervailing the output torque of the first motor generator by driving the second motor generator. Therefore, ordinarily, a gear shift is inhibited during the startup of the engine, and is carried out after the startup of the engine is completed. Moreover, since a shifting preparatory control such as a play reducing of a transmission mechanism is required before executing a shifting operation, a time-lag occurs during the period from an instant when a shifting command is outputted until the instant when the shifting operation is substantially started. Because of this, there arises a problem that a rise of the driving force is delayed at the starting time of driving a vehicle, in case the shifting preparatory control is carried out after the engine is started completely.

According to the invention disclosed in the aforementioned Japanese Published Examined Application 47-31773, moreover, there is a problem such that the shocks occur if a timing of switching between the high brake and the low brake is off.

SUMMARY OF THE INVENTION

The present invention has been conceived noting the technical problems thus far described and its object is to provide a control system which can prevent a delay in a rise of driving force by carrying out a shifting preparatory control prior to an instant when a startup of a prime mover is completed.

In order to achieve the above-specified objects, this invention is constructed to switch a shift control condition in accordance with an action state of a main prime mover such as an engine. Specifically, according to this invention, there is provided a control system for a hybrid drive unit in which an assist prime mover is connected through a transmission mechanism to an output member, to which a torque is outputted by a main prime mover is transmitted, wherein the shift control condition is switched in accordance with the action state of said main prime mover. The action state of said main prime mover includes the action state in the course of starting the main prime mover.

According to the invention, therefore, a control condition of the transmission accords to the action state of the main prime mover so that the effects of behaviors of the transmission and the assist prime mover on the output torque can be suppressed.

Moreover, according to the invention, the gear shift of the transmission is inhibited unless the startup of an internal combustion engine, which constructs the main prime mover, is not completed. Therefore, fluctuation in an output shaft torque at the startup of the internal combustion engine can be prevented or suppressed. In addition, the shifting operation is carried out after the startup of the internal combustion engine is completed, so that the vehicle starts moving smoothly.

Furthermore, according to the invention, the assist prime mover is so controlled as to reduce the torque which is transmitted from the main prime mover to the output member in connection with starting of the main prime mover. Therefore, a situation of a startup control of the main prime mover can be known on the basis of a control condition of the assist prime mover, and the shifting operation of the transmission is inhibited during the startup control.

The above and further objects and novel features of this invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 4(A) is a nomographic diagram concerning a planetary gear mechanism shown in FIG. 3, and FIG. 4(B) is a nomographic diagram concerning a Ravignaux type planetary gear mechanism shown in FIG. 3

DETAILED DESCRIPTION OF THE PREFERRED EMBODIMENT

Figure 2:
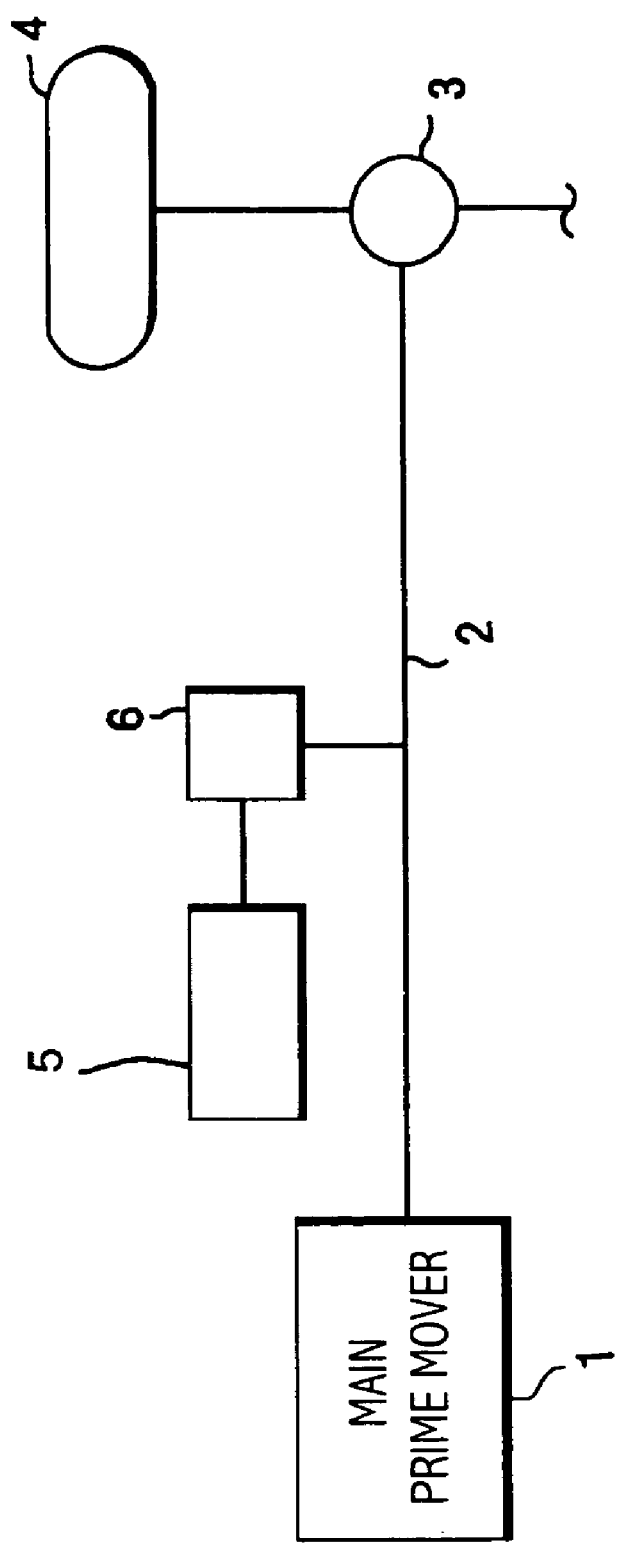
FIG. 2 is a block diagram schematically showing one example of a hybrid drive unit to which this invention is applied.

This invention will be described in connection with its specific examples. The first description is made on a hybrid drive unit, to which this invention is applied. The hybrid drive unit or an application target of this invention is mounted on a vehicle, for example. As shown in FIG. 2, the torque of a main prime mover (i.e., a first prime mover) 1 is transmitted to an output member 2, from which the torque is transmitted through a differential 3 to drive wheels 4. On the other hand, there is provided an assist prime mover (i.e., a second prime mover) 5, which can make a power running control to output a driving force for a drive and a regenerative control to recover an energy. This assist prime mover 5 is connected through a transmission 6 to the output member 2. Between the assist prime mover 5 and the output member 2, therefore, the transmission torque is increased/decreased according to a gear ratio to be set by the transmission 6.

This transmission 6 can be constructed to set the gear ratio at "1" or higher. With this construction, at the power running time for the assist prime mover 5 to output the torque, this torque can be raised and transmitted to the output member 2 so that the assist prime mover 5 can be made to have a low capacity or a small size. However, it is preferred that the running efficiency of the assist prime mover 5 is kept in a satisfactory state. In case the speed of the output member 2 rises according to the vehicle speed, for example, the gear ratio is lowered to decrease the speed of the assist prime mover 5. In case the speed of the output member 2 drops, on the other hand, the gear ratio may be raised.

Figure 3:
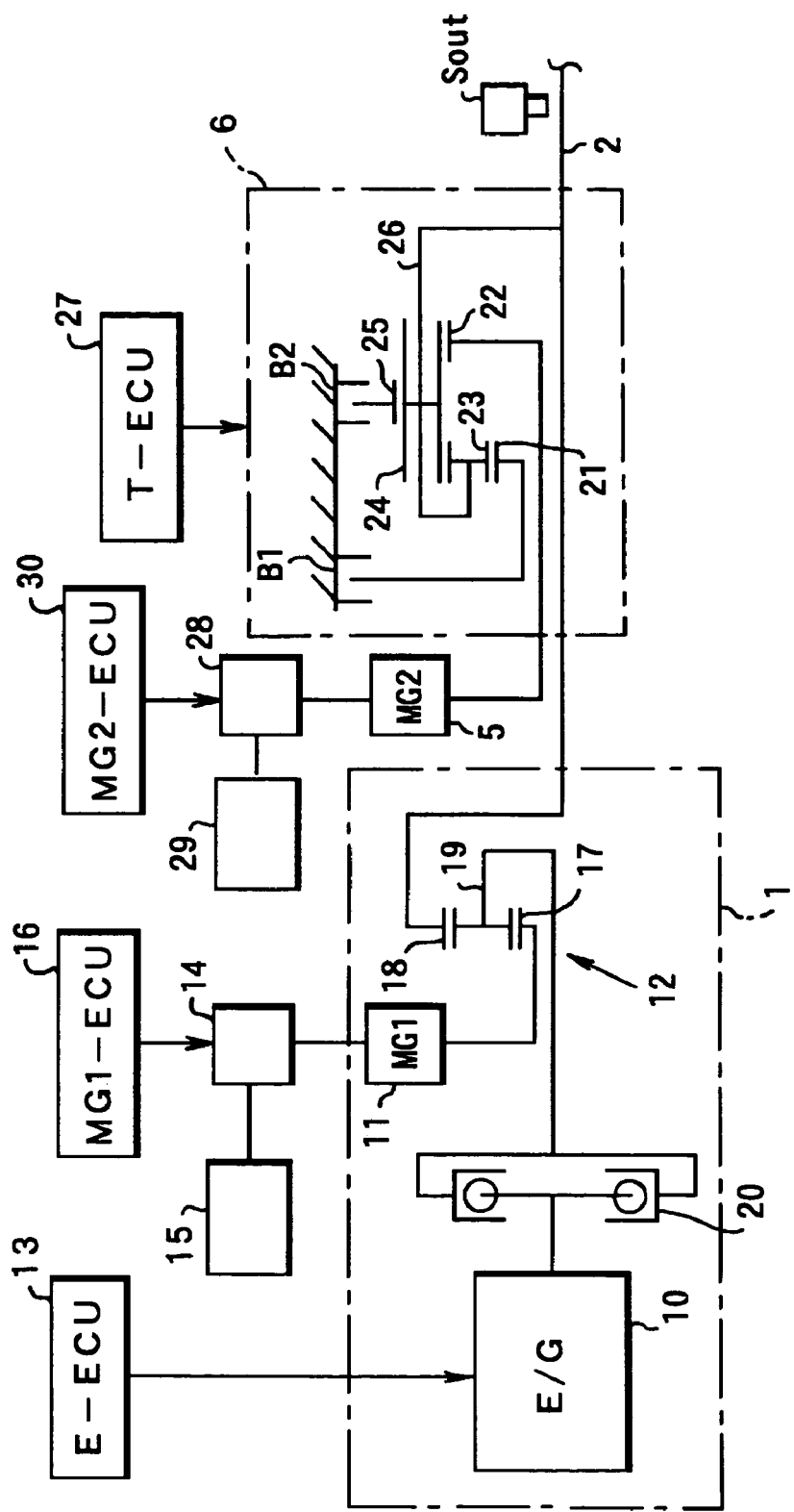
FIG. 3 is a skeleton diagram showing the hybrid drive unit more specifically.

The aforementioned hybrid drive unit will be described more specifically hereafter. As shown in FIG. 3, the main prime mover 1 is mainly constructed to include an internal combustion engine (as will be called the "engine" hereinafter) 10, a motor generator (as will be tentatively called the "first motor generator" or "MG 1") 11, and a planetary gear mechanism 12 for synthesizing or distributing the torque between those internal combustion engine 10 and first motor generator 11. The engine 10 is a well-known power unit such as a gasoline engine or a diesel engine for outputting a power by burning a fuel, and is so constructed that its running state such as the throttle opening (or the air intake amount), the fuel feed amount or the ignition timing can be electrically controlled. This control is made by an electronic control unit (E-ECU) 13 composed mainly of a microcomputer, for example.

On the other hand, the first motor generator 11 is exemplified by a synchronous electric motor and is constructed to function as an electric motor and a dynamo. The first motor generator 11 is connected through an inverter 14 with an accumulator device 15 such as a battery. By controlling the inverter 14, moreover, the output torque or the regenerative torque of the first motor generator 11 is suitably set. For this control, there is provided an electronic control unit (MG1-ECU) 16, which is composed mainly of a microcomputer. Here, a stator (not shown) of the first motor generator 11 is so fixed that it cannot rotate.

Moreover, the planetary gear mechanism 12 is a well-known one for establishing a differential action with three rotary elements: a sun gear 17 or an external gear; a ring gear 18 or an internal gear arranged concentrically with the sun gear 17; and a carrier 19 holding a pinion gear meshing with those sun gear 17 and ring gear 18 such that the pinion gear may rotate on its axis and revolve around the carrier 19. The engine 10 has its output shaft connected through a damper 20 to the carrier 19 as a first rotary element. In other words, the carrier 19 acts as an input element.

On the other hand, the rotor (not shown) of the first motor generator 11 is connected to the sun gear 17 as a second rotary element. Therefore, this sun gear 17 is the so-called "reaction element", and the ring gear 18 as a third rotary element is the output element. And, this ring gear 18 is connected to the output member (i.e., the output shaft) 2.

In the example shown in FIG. 3, on the other hand, the transmission 6 is constructed of one set of Ravignaux type planetary gear mechanisms. These planetary gear mechanisms are individually provided with external gears, i.e., a first sun gear (S1) 21 and a second sun gear (S2) 22, of which the first sun gear 21 meshes with a short pinion 23, which meshes with an axially longer long pinion 24, which meshes with a ring gear (R) 25 arranged concentrically with the individual sun gears 21 and 22. Here, the individual pinions 23 and 24 are so held by a carrier (C) 26 as to rotate on their axes and to revolve around the carrier 26. Moreover, the second sun gear 22 meshes with the long pinion 24. Thus, the first sun gear 21 and the ring gear 25 construct a mechanism corresponding to a double-pinion type planetary gear mechanism together with the individual pinions 23 and 24, and the second sun gear 22 and the ring gear 25 construct a mechanism corresponding to a single pinion type planetary gear mechanism together with the long pinion 24.

There are also provided a first brake B1 for fixing the first sun gear 21 selectively, and a second brake B2 for fixing the ring gear 25 selectively. These brakes B1 and B2 are the so-called "frictional engagement devices" for establishing applying forces by frictional forces, and can adopt a multi-disc engagement device or a band type engagement device. The brakes B1 and B2 are constructed to change their torque capacities continuously according to the engaging forces of oil pressures or electromagnetic forces. Moreover, the aforementioned assist prime mover 5 is connected to the second sun gear 22, and the carrier 26 is connected to the output shaft 2.

In the transmission 6 thus far described, therefore, the second sun gear 22 is the so-called "input element", and the carrier 26 is the output element. The transmission 6 is constructed to set high gear stages of gear ratios higher than "1" by applying the first brake B1, and to set low gear stages of gear ratios higher than those of the high gear stages by applying the second brake B2 in place of the first brake B1. The shifting operations between those individual gear stages are executed on the basis of a running state such as a vehicle speed or a drive demand (or the accelerator opening). More specifically, the shifting operations are controlled by predetermining gear stage regions as a map (or a shifting diagram) and by setting any of the gear stages according to the detected running state. For these controls, there is provided an electronic control unit (T-ECU) 27, which is composed mainly of a microcomputer.

Here, in the example shown in FIG. 3, there is adopted as the assist prime mover 5 a motor generator (as will be tentatively called the "second motor generator" or "MG2"), which can have the power running mode to output the torque and the regenerative mode to recover the energy. A rotor (not shown) of the second motor generator 5 is connected to the second sun gear 22. Moreover, the second motor generator 5 is connected through an inverter 28 to the battery 29. The power running mode, the regenerative mode and the torques in the individual modes are controlled by controlling the inverter 28 by an electronic control unit (MG2-ECU) 30 composed mainly of a microcomputer. Here, the battery 29 and the electronic control unit 30 can also be integrated with the inverter 14 and the battery (the accumulator device) 15 for the aforementioned first motor generator 11. Here, a stator (not shown) of the second motor generator 5 is so fixed that it cannot rotate.

A nomographic diagram of the single pinion type planetary gear mechanism 12 as the aforementioned torque synthesizing/distributing mechanism is present at (A) in FIG. 4. When the reaction torque by the first motor generator 11 is inputted to the sun gear (S) 17 against the torque to be inputted to the carrier (C) 19 and outputted by the engine 10, a higher torque than that inputted from the engine 10 appears at the ring gear (R) 18 acting as the output element. In this case, the rotor of the first motor generator 11 is rotated by the torque, and the first motor generator 11 functions as a dynamo. With the speed (or the output speed) of the ring gear 18 being constant, on the other hand, the speed of the engine 10 can be continuously (or without any step) changed by increasing/decreasing the speed of the first motor generator 11. Specifically, the control for setting the speed of the engine 10 at a value for the best fuel economy can be made by controlling the first motor generator 11.

As indicated by a chain line in FIG. 4(A), moreover, the first motor generator 11 rotates backward when the engine 10 is halted while the vehicle is running. In this state, if the torque is outputted in a forward direction by operating the first motor generator 11 as the electric motor, the torque acts on the engine 10 connected to the carrier 19 to rotate it in the forward direction. As a result, the engine 10 can be started (i.e., motored or cranked) by the first motor generator 11. In this case, the torque acts on the output shaft 2 in the direction to stop the rotation of the output shaft 2. Therefore, the driving torque for running can be maintained by controlling the torque outputted from the second motor generator 5, and at the same time, the startup of the engine 10 can be executed smoothly. Here, the hybrid type of this kind is called "mechanical distribution type" or "split type".

On the other hand, a nomographic diagram of the Ravignaux type planetary gear mechanism constructing the transmission 6 is presented at (B) in FIG. 4. When the ring gear 25 is fixed by the second brake B2, a low gear stage L is set so that the torque outputted from the second motor generator 5 is amplified according to the gear ratio and applied to the output shaft 2. When the first sun gear 21 is fixed by the first brake B1, on the other hand, there is set a high gear stage H having a lower gear ratio than that of the low gear stage L. The gear ratio at this high gear stage H is higher than "1" so that the torque outputted by the second motor generator 5 is augmented according to that gear ratio and applied to the output shaft 2.

Here, in the state where the individual gear stages L and H are steadily set, the torque to be applied to the output shaft 2 is such one as is augmented from the output torque of the second motor generator 5 according to the gear ratio. In the shifting transitional state, however, the torque is such one as is influenced by the torque capacities at the individual brakes B1 and B2 and by the inertia torque accompanying the speed change. On the other hand, the torque to be applied to the output shaft 2 is positive in the drive state of the second motor generator 5 but negative in the driven state.

The hybrid drive unit thus far described comprises two prime movers such as the main prime mover 1 and the assist prime mover 5, so that the vehicle runs with low fuel consumption and low emission by making good use of those prime movers. Even in case of driving the engine 10, the speed of the engine 10 is controlled for the optimum fuel consumption by the first motor generator 11. Moreover, inertia energy of the vehicle is regenerated as an electric power at the coasting time. In case the torque is assisted by driving the second motor generator 5, the torque to be added to the output shaft 2 is increased by setting the transmission 6 at the low gear stage L when the vehicle speed is low, and the speed of the second motor generator 5 is relatively lowered to reduce the loss by setting the transmission 6 at the high gear stage H when the vehicle speed is raised. As a result, the torque assist is executed efficiently.

The gear shift of the second motor generator 5 is inhibited during the cranking of the engine is being carried out by the first motor generator 11, because it is necessary to countervail the output of the torque to the output shaft by the second motor generator 5. Therefore, it is necessary to output the shifting command after the cranking is ended in case of carrying out the gear shift at the startup of the engine 10, as the case of starting to move the vehicle under the state where the high gear stage H is set at the startup of the engine 10. This causes a problem such that a rise of the driving force is delayed at the starting time of driving a vehicle. Following controls are executed in order to avoid this problem.

Figure 1:
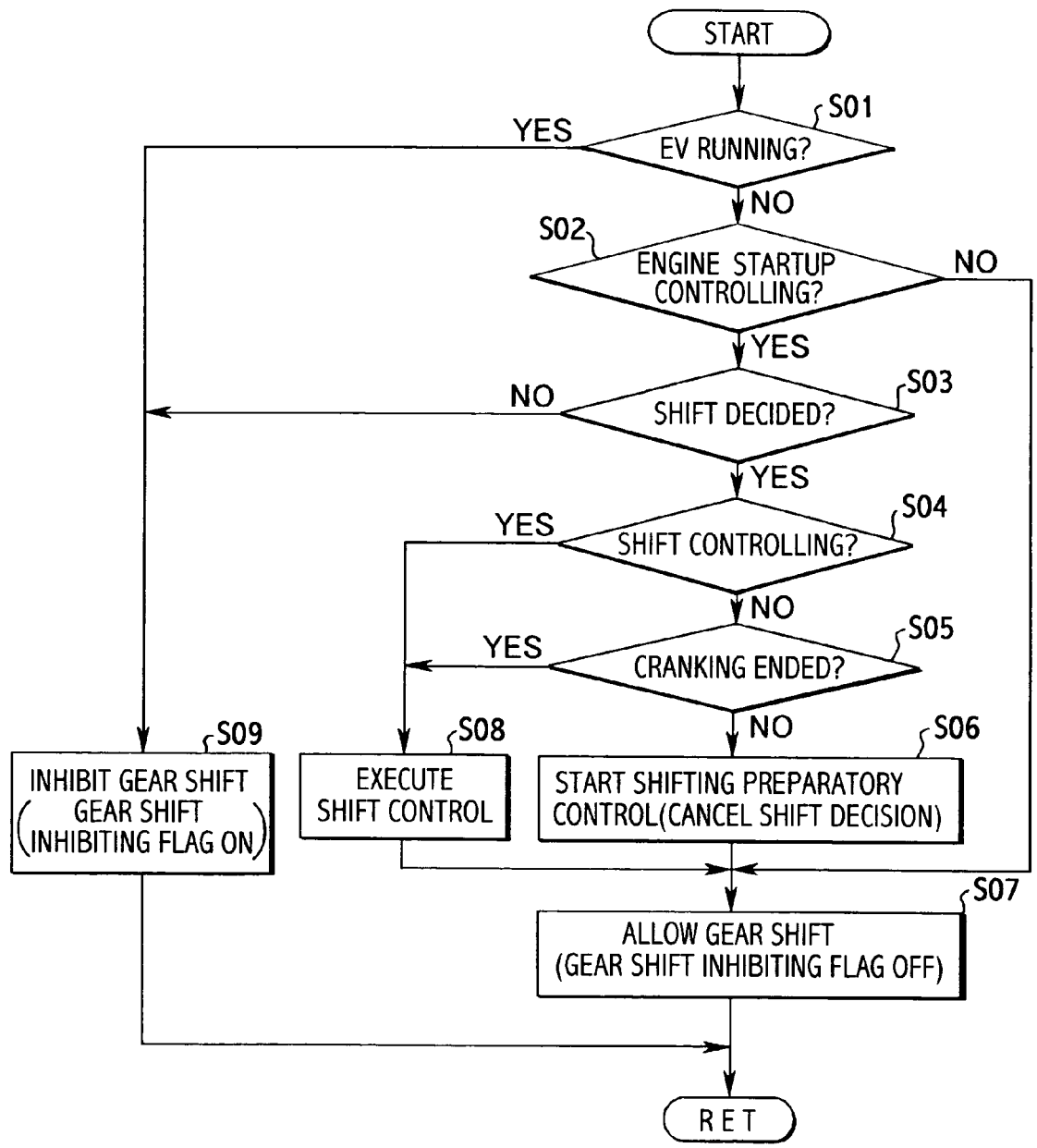
FIG. 1 is a schematic flow chart explaining a control example by a control system of this invention.

One example of a flowchart of the control is shown in FIG. 1. First of all, it is decided (at Step S01) whether or not a current status is in EV running. The "EV running" means the state in which the vehicle is being driven by the second motor generator 5. This running state is automatically selected by considering a drive demand, a charging amount of the batteries 15 and 29, the action state of the entire hybrid drive unit and so on. Here, the EV running does not include the case in which the control to startup the engine 10 is carried out, but includes the case in which the control to halt the engine 10 is carried out.

In case the answer of Step S01 is YES, a gear shift inhibiting flag is turned ON and the gear shift is inhibited (at Step S09). As a result of this, the gear shift is inhibited and fluctuation in the torque is suppressed in case the mechanism is driven by the second motor generator 5.

In case the answer of Step S01 is NO, specifically, in case the driving is not executed by the second motor generator 5, it is decided (at Step S02) whether or not the startup control of the engine 10 is being carried out. In case the answer of Step S02 is NO, specifically, in case the running state is in a steady running state established by the engine 10, the gear shift inhibiting flag is turned OFF and the gear shift is allowed (at Step S07).

In case the answer of Step S02 is YES, specifically, in case neither the driving is executed by the second motor generator 5 nor the engine 10 is started, in short, in case the vehicle is not running, it is decided (at Step S03) whether or not the shifting command is outputted. In case the answer of Step S03 is NO, the gear shift is inhibited (at Step S09).

Since the engine startup control is started, the cranking of the engine 10 by the first motor generator 11 is started. On the other hand, the first motor generator 11 is connected also to the output shaft 2, so that the torque generated by the first motor generator 11 has to appear also on the output shaft 2. Therefore, it is necessary to countervail this torque by the second motor generator 5. In order to avoid unnecessary fluctuation in the torque of the second motor generator 5 resulting from the shifting operation, therefore, the gear shift is inhibited.

In case the answer of Step S03 is YES, it is decided (at Step S04) whether or not the shift control is currently being executed. In case the answer of Step S04 is YES, the shifting operation currently in execution is continued (at Step S08). In case the answer of Step S04 is NO, specifically, in case the engine 10 is in the startup control and the shift control has not yet been carried out, it is decided (at Step S05) whether or not the cranking of the engine 10 is ended. Here, a definition of the "cranking" is a period during the countervailing of the torque is executed by the second motor generator 5. For example, the "cranking" includes the period during a damping control to suppress a startup vibration of the engine 10 is executed by the second motor generator 5.

In case the answer of Step S05 is YES, specifically, in case a necessity to countervail the torque by the second motor generator 5 is eliminated, the shift control is carried out (at Step S08). In case the answer of Step S05 is NO, specifically, in case of cranking currently, a shifting preparatory action is started (at Step S06). The shifting preparatory action is an action to carry out so-called "play reducing" at a switching time between brakes B1 and B2 activated by an oil pressure, which is carried out prior to the actual shifting operation.

When processes are ended at Steps S06 and S08, a gear shift inhibiting flag is turned OFF and the gear shift is allowed (at Step S07). Then, wait until the cranking is ended, and the gear shift is carried out or continued when the next or later routine is executed.

The shifting preparatory action (at Step S06) prior to the shifting operation is carried out in case a decision result of Step S05 is NO, in other words, in the state where the cranking is not completed. Specifically, the cranking action and the shifting preparatory action are executed concurrently. Therefore, the period from an output instant of the shifting command to a starting instant of the gear shift is shortened, so that the driving force can rise quickly.

Moreover, in each of the states such as the EV running state, the engine startup state, the cranking state, and a cranking ending state, the action state of the main prime mover 1 is switched to the shift control conditions such as a gear shift inhibiting condition, a gear shift allowing condition, a gear shift preparatory condition, and a gear shift executing condition. Specifically, the condition of the shift control is changed in accordance with the action state of the main prime mover 1. Therefore, the driving force can rise properly in accordance with each action states.

Furthermore, in case the main prime mover 1 is being cranked, it is necessary to countervail the torque appearing on the output shaft 2 during the cranking by the second motor generator 5. Therefore, the gear shift is inhibited and is allowed at an ending instant of the cranking or after the cranking. Specifically, an inhibition or an allowance of the gear shift is made in accordance with the action state of the second motor generator 5. Therefore, unnecessary fluctuation in the torque can be prevented.

Here will be briefly described the relation between the aforementioned individual examples and the present invention. The means for executing the individual controls of Steps S06 to S09 shown in the aforementioned FIG. 1 correspond to the gear shift control means of the invention, the means for executing the control of Step S06 correspond to the means for executing the shifting preparatory control, and the means for executing the control of Step S08 correspond to the means for executing the gear shift after the completion of the startup. Also, the means for executing the control of Step S07 correspond to the means for executing the gear shift, and the means for executing the control of Step S09 correspond to the gear shift inhibiting means. In addition, the second motor generator 5 corresponds to the assist prime mover of the invention.

Here, this invention should not be limited to the specific examples thus far described. The hybrid drive unit, to which this invention is applied, is properly exemplified by the so-called "mechanical distribution type" hybrid drive unit in which the torque of the internal combustion engine and the torque of the first motor generator (or the electric motor) are transmitted to the output member through the synthesizing/distributing mechanism composed mainly of the planetary gear mechanism, as shown in FIG. 3, and in which the torque of the second motor generator (or the electric motor) is transmitted to the output member through the transmission.

However, the hybrid drive unit of the invention may have another construction. In short, the hybrid drive unit, in which the second prime mover is connected to the output member to which the torque is transmitted from the first prime mover. Moreover, the transmission of the invention may be not only the transmission having the construction to shift the gear stage between high and low, but also a multiple-stage type transmission or a continuously variable transmission.

Here will be synthetically described the advantages to be attained by this invention. According to the invention, the transmission can be controlled properly in accordance with the action state of the main prime mover. Therefore, the driving force can be raised properly at the starting time of driving.

Moreover, according to the invention, the shifting preparatory control is carried out prior to the shift control when the internal combustion engine constructing the main prime mover is started by an external force. Therefore, the vehicle can be started moving by executing the gear shift immediately at the instant when the startup of the internal combustion engine is completed. Accordingly, the driving force can be raised quickly at the starting time of driving.

Still moreover, according to the invention, the control subsequent to the shifting preparatory control is started at the instant when the startup of the main prime mover is completed. Therefore, the gear shift can be executed with a good response.

Furthermore, according to the invention, the gear shift is inhibited or allowed in accordance with the action state of the assist prime mover. Therefore, the torque can is prevented from fluctuating unnecessarily so that the driver can drive the vehicle without any uncomfortable feeling.

What is claimed is:

1. A control system for a hybrid drive unit, in which an assist prime mover is connected through a transmission mechanism to an output member, to which a torque outputted by a main prime mover is transmitted, comprising:
   gear shift control means for switching a shift control condition of said transmission in accordance with an action state of said main prime mover; and
   wherein said gear shift control means include means for switching the shift control condition of said transmission in accordance with a situation of a control to startup said main prime mover.

2. A control system for a hybrid drive unit in which an assist prime mover is connected through a transmission mechanism to an output member, to which a torque outputted by a main prime mover is transmitted, comprising:
gear shift control means for switching a shift control condition of said transmission in accordance with an action state of said main prime mover,
wherein said main prime mover includes an internal combustion engine which is started by an external force; and
wherein said gear shift control means include means for executing a shifting preparatory control to put said transmission into the state just before a gear ratio changes, while said internal combustion engine is being startedby the external force, and means for changing the gear ratio of said transmission after the startup of said internal combustion engine is completed.

3. A control system for a hybrid drive unit according claim 2,
wherein said gear shift control means include means for starting the shift control to change the gear ratio of said transmission at the instant when the startup of said internal combustion engine is completed.

4. A control system for a hybrid drive unit in which an assist prime mover is connected through a transmission mechanism to an output member, to which a torque outputted by a main prime mover is transmitted, comprising:
gear shift control means for switching a shift control condition of said transmission in accordance with an action state of said main prime mover,
wherein said gear shift control means include gear shift inhibiting means for inhibiting the shift control to change the gear ratio of said transmission, when said assist prime mover outputs the torque in connection with the startup of said main prime mover.

5. A control system for a hybrid drive unit in which an assist prime mover is connected through a transmission mechanism to an output member, to which a torque outputted by a main prime mover is transmitted, comprising:
gear shift control means for switching a shift control condition of said transmission in accordance with an action state of said main prime mover,
wherein said gear shift control means include the gear shift inhibiting means for inhibiting the shift control to change the gear ratio of said transmission, when the vehicle having said hybrid drive unit is run by a power of said assist prime mover.

6. A control system for a hybrid drive unit in which an assist prime mover is connected through a transmission mechanism to an output member, to which a torque outputted by a main prime mover is transmitted, comprising:
gear shift control means for switching a shift control condition of said transmission in accordance with an action state of said main prime mover,
wherein said main prime mover comprises a torque distributing mechanism composed of a planetary gear mechanism for establishing a differential action with three rotary elements from first to third, the internal combustion engine connected to the first rotary element, and a motor generator connected to the second rotary element;
wherein said output member is connected to the third rotary element; and
wherein said internal combustion engine is rotated and started by the torque outputted by said motor generator.

7. A control system for a hybrid drive unit according to claim 6, comprising:
control means for controlling the output of said assist prime mover so as to reduce the torque transmitted from said torque distributing mechanism to said output member as a result of rotating said internal combustion engine by the torque outputted from said motor generator;
startup control deciding means for deciding that said internal combustion is under a startup control in connection with controlling the output of said assist prime mover by said control means; and
the gear shift inhibiting means for inhibiting the shift control to change the gear ratio of said transmission, in case said startup control deciding means decides that said internal combustion engine is under the startup control.

8. A control system for a hybrid drive unit according to claim 7,
wherein said gear shift control means include shifting preparatory means for executing the shifting preparatory control to put said transmission into the state just before the gear ratio changes, when the shift control of said transmission is inhibited by said gear shift inhibiting means.

9. A control system for a hybrid drive unit according to claim 8,
wherein said transmission comprises an engagement device for changing the gear ratio by being engaged; and
wherein said shifting preparatory means include means for operating said engagement device into the state just before the engagement.

10. A control method for a hybrid drive unit in which an assist prime mover is connected through a transmission mechanism to an output member, to which a torque outputted by a main prime mover is transmitted, comprising:
a gear shift control step for switching the shift control condition of said transmission in accordance with an action state of said main prime mover; and
wherein the shift control condition of said transmission is switched in accordance with the situation of the control to startup said main prime mover, at said gear shift control step.

11. A control method for a hybrid drive unit in which an assist prime mover is connected through a transmission mechanism to an output member, to which a torque outputted by a main prime mover is transmitted, comprising:
a gear shift control step for switching the shift control condition of said transmission in accordance with an action state of said main prime mover,
wherein said transmission is brought into the state just before a gear ratio changes, during said internal combustion engine included in said main prime mover is being started by the external force, and the gear ratio of said transmission is changed after the startup of said internal combustion engine is completed, at said gear shift control step.

12. A control method for a hybrid drive unit according to claim 11,
wherein the gear ratio of said transmission is changed at the instant when the startup of said internal combustion engine is completed.

13. A control method for a hybrid drive unit in which an assist prime mover is connected through a transmission mechanism to an output member, to which a torque outputted by a main prime mover is transmitted, comprising:
a gear shift control step for switching the shift control condition of said transmission in accordance with an action state of said main prime mover, wherein the shift control to change the gear ratio of said transmission is inhibited when said assist prime mover outputs the torque in connection with the startup of said main prime mover, at said gear shift control step.

14. A control method for a hybrid drive unit in which an assist prime mover is connected through a transmission mechanism to an output member, to which a torque outputted by a main prime mover is transmitted, comprising:
a gear shift control step for switching the shift control condition of said transmission in accordance with an action state of said main prime mover,
wherein the shift control to change the gear ratio of said transmission is inhibited in case the vehicle having said hybrid drive unit is run by the power of said assist prime mover.

15. A control method for a hybrid drive unit in which an assist prime mover is connected through a transmission mechanism to an output member, to which a torque outputted by a main prime mover is transmitted, comprising:
a gear shift control step for switching the shift control condition of said transmission in accordance with an action state of said main prime mover,
wherein said main prime mover comprises a torque distributing mechanism composed of the planetary gear mechanism for establishing the differential action with three rotary elements from first to third; the internal combustion engine connected to the first rotary element; and a motor generator connected to the second rotary element;
wherein said output member is connected to the third rotary element;
wherein the output of said assist prime mover is controlled to reduce the torque transmitted from said torque distributing mechanism to said output member, when said internal combustion engine is rotated and started by said motor generator; and
wherein the shift control to change the gear ratio of said transmission is inhibited in case the output of said assist prime mover is controlled.

16. A control method for a hybrid drive unit according to claim 15,
wherein the shifting preparatory control to put said transmission into the state just before the gear ratio changes is executed, when the shift control of said transmission is inhibited.

17. A control method for a hybrid drive unit according to claim 16,
wherein said shifting preparatory control includes a control to put the engagement device of said transmission into the state just before the engagement.

* * * * *